United States Patent
Bae et al.

(10) Patent No.: US 12,459,049 B2
(45) Date of Patent: Nov. 4, 2025

(54) METHOD FOR WELDING A ZINC COATED STEEL SHEET

(71) Applicant: POSCO, Pohang-si (KR)

(72) Inventors: Gyu-Yeol Bae, Incheon (KR); Ho-Soo Kim, Incheon (KR)

(73) Assignee: POSCO CO., LTD, Pohang-si (KR)

( * ) Notice: Subject to any disclaimer, the term of this patent is extended or adjusted under 35 U.S.C. 154(b) by 870 days.

(21) Appl. No.: 17/289,537

(22) PCT Filed: Oct. 8, 2019

(86) PCT No.: PCT/KR2019/013207
§ 371 (c)(1),
(2) Date: Apr. 28, 2021

(87) PCT Pub. No.: WO2020/091254
PCT Pub. Date: May 7, 2020

(65) Prior Publication Data
US 2021/0394294 A1    Dec. 23, 2021

(30) Foreign Application Priority Data
Oct. 29, 2018 (KR) .......................... 10-2018-0129810

(51) Int. Cl.
*B23K 9/23* (2006.01)
*B23K 9/09* (2006.01)
(Continued)

(52) U.S. Cl.
CPC ............... *B23K 9/23* (2013.01); *B23K 9/092* (2013.01); *B23K 9/095* (2013.01); *B23K 9/1006* (2013.01);
(Continued)

(58) Field of Classification Search
CPC .......... B23K 9/23; B23K 9/092; B23K 9/095; B23K 9/1006; B23K 9/16; B23K 2101/34;
(Continued)

(56) References Cited

U.S. PATENT DOCUMENTS

2009/0230108 A1*  9/2009  Nakahara ............... B23K 9/23
                                                            219/137 PS
2010/0288742 A1   11/2010  Nishikawa et al.
(Continued)

FOREIGN PATENT DOCUMENTS

CN    106163720 A    11/2016
JP    H07-009150 A    1/1995
(Continued)

OTHER PUBLICATIONS

Lincoln—Solutions for Welding Zinc Coated Steels (2015) (Year: 2015).*
(Continued)

*Primary Examiner* — Steven W Crabb
*Assistant Examiner* — Alba T Rosario-Aponte
(74) *Attorney, Agent, or Firm* — Morgan Lewis & Bockius LLP

(57) ABSTRACT

A method for welding a zinc coated steel sheet is provided. The method for welding a zinc coated steel sheet of the present invention is a method for welding a zinc coated steel sheet by using a welding material, wherein when welding, the welding current is 150-300 A, a shielding gas is a mixed gas of Ar+10-30% $CO_2$, and the welding polarity is alternately altered so that the welding polarity fraction defined by relational equation 1 satisfies the range of 0.25-0.35.

3 Claims, 3 Drawing Sheets

(51) Int. Cl.
  *B23K 9/095* (2006.01)
  *B23K 9/10* (2006.01)
  *B23K 9/16* (2006.01)
  *B23K 101/34* (2006.01)
  *B23K 103/04* (2006.01)
(52) U.S. Cl.
  CPC ............ *B23K 9/16* (2013.01); *B23K 2101/34* (2018.08); *B23K 2103/04* (2018.08)
(58) Field of Classification Search
  CPC ............ B23K 2103/04; B23K 2101/18; B23K 9/173; B23K 9/164
  USPC ...................................................... 219/137 R
  See application file for complete search history.

(56) References Cited

U.S. PATENT DOCUMENTS

| | | | | |
|---|---|---|---|---|
| 2012/0118866 | A1* | 5/2012 | Tanaka | B23K 9/0738 219/130.33 |
| 2014/0238555 | A1* | 8/2014 | Funakawa | C22C 38/04 148/602 |
| 2015/0099140 | A1* | 4/2015 | Amata | B23K 35/3618 219/146.1 |
| 2016/0082541 | A1 | 3/2016 | Barhorst et al. | |
| 2017/0113293 | A1 | 4/2017 | Tenry et al. | |
| 2017/0326672 | A1 | 11/2017 | Nobutoki et al. | |
| 2020/0056643 | A1* | 2/2020 | Hosomi | B32B 15/04 |

FOREIGN PATENT DOCUMENTS

| | | |
|---|---|---|
| JP | H11-138265 A | 5/1999 |
| JP | 2003-334657 A | 11/2003 |
| JP | 2005-028383 A | 2/2005 |
| JP | 2005-324230 A | 11/2005 |
| JP | 2008-018436 A | 1/2008 |
| JP | 2010-264487 A | 11/2010 |
| JP | 2011-092950 A | 5/2011 |
| JP | 2012-101232 A | 5/2012 |
| JP | 2012183542 A * | 9/2012 |
| JP | 2013-063460 A | 4/2013 |
| JP | 2014-061526 A | 4/2014 |
| JP | 2015-167981 A | 9/2015 |
| JP | 2016-101593 A | 6/2016 |
| JP | 2017-080804 A | 5/2017 |
| KR | 10-2011-0008787 A | 1/2011 |
| KR | 10-2014-0064764 A | 5/2014 |
| KR | 10-2015-0145479 A | 12/2015 |
| KR | 10-1637656 B1 | 7/2016 |
| KR | 10-2018-0074826 A | 7/2018 |
| WO | 2013/006350 A1 | 1/2013 |
| WO | 2015/018989 A1 | 2/2015 |
| WO | 2015/150906 A1 | 10/2015 |

OTHER PUBLICATIONS

Joseph et al., Variable Polarity (AC) Arc Weld Brazing of Galvanized Sheet (Year: 2003).*
JP-2012183542-A English Translation (Year: 2012).*
International Search Report dated Jan. 17, 2020 issued in International Patent Application No. PCT/KR2019/013207 (with English translation).
Indian Office Action dated Sep. 9, 2021 issued in Indian Patent Application No. 202117013116 (English translation).
Japanese Office Action dated Apr. 5, 2022 issued in Japanese Office Action No. 2021-518922.
Chinese Office Action dated Jan. 29, 2022 issued in Chinese Patent Application No. 201980071010.5 (with English translation).
Extended European Search Report dated Dec. 13, 2021 issued in European Patent Application No. 19879821.7.
Y. Su, et al., "Quantitative characterization of porosity in Fe—Al dissimilar materials lap joint made by gas metal arc welding with different current modes," Journal of Materials Processing Technology, vol. 214, No. 1, pp. 81-86, 2014.
Lincoln Electric: 'Metalshield Z Mild Steel AWS E70-GS,' Oct. 2016.

* cited by examiner

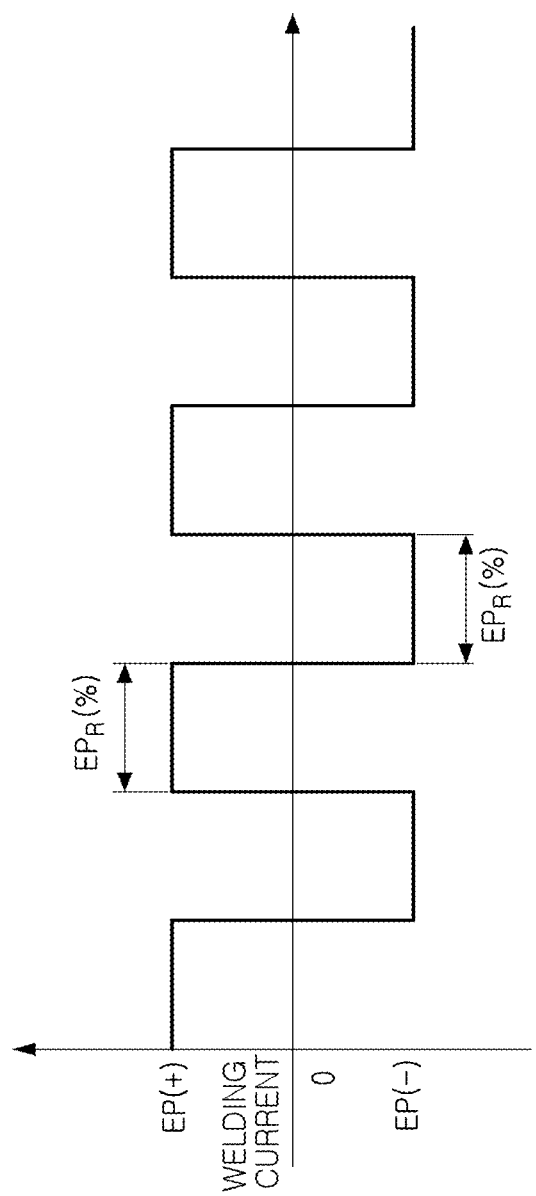

[FIG. 2]
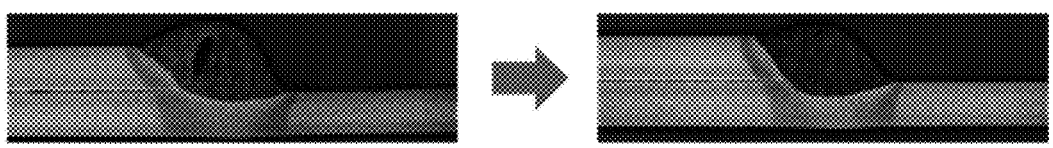
[FIG. 3]
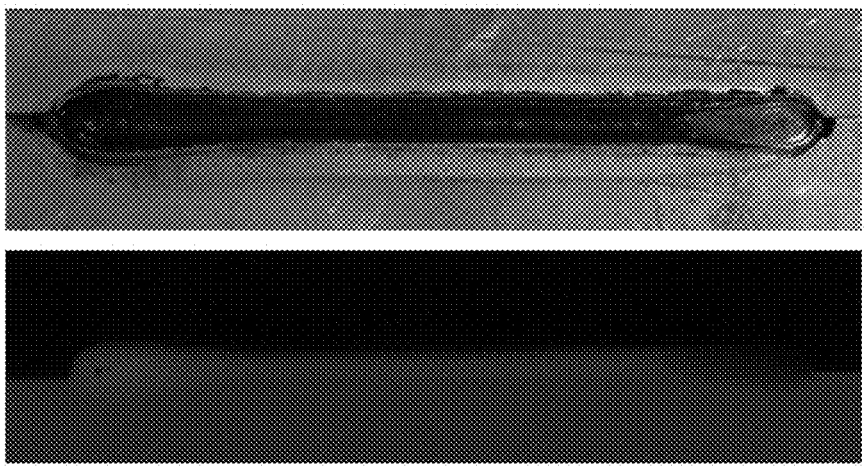

[FIG. 4]
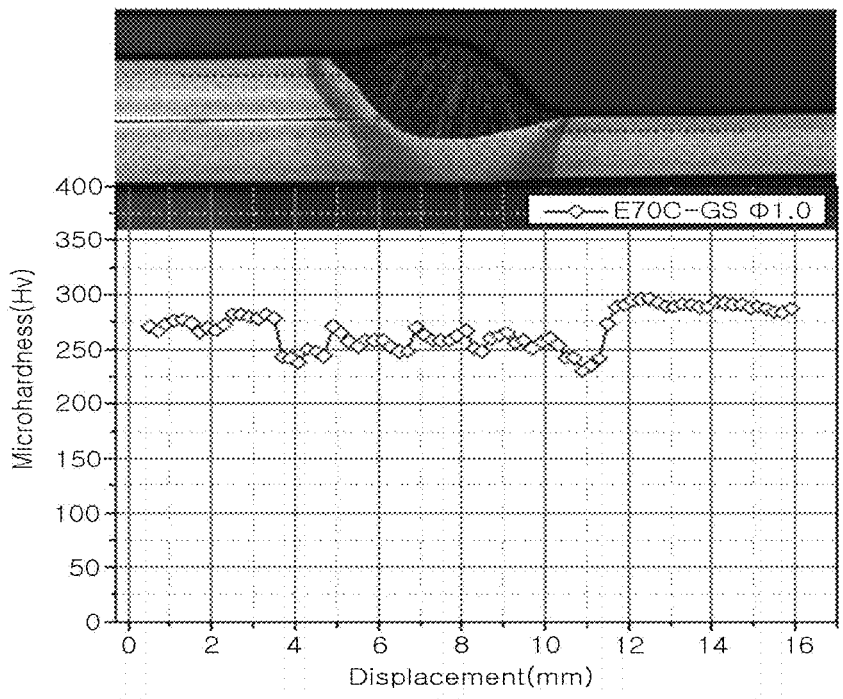
[FIG. 5]
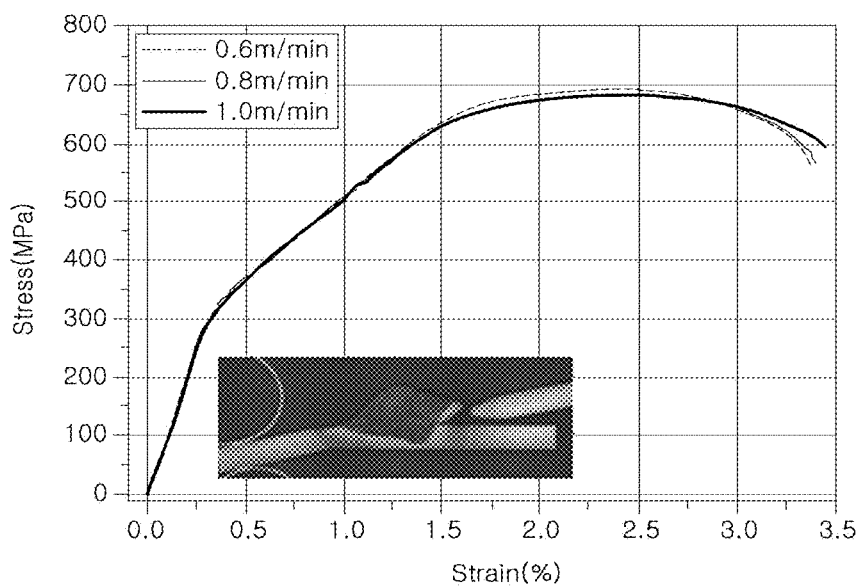

METHOD FOR WELDING A ZINC COATED STEEL SHEET

CROSS-REFERENCE OF RELATED APPLICATIONS

This application is the U.S. National Phase under 35 U.S.C. § 371 of International Patent Application No. PCT/KR2019/013207, filed on Oct. 8, 2019, which in turn claims the benefit of Korean Application No. 10-2018-0129810, filed on Oct. 29, 2018, the entire disclosures of which applications are incorporated by reference herein.

TECHNICAL FIELD

The present invention relates to a method for lap-joint welding a hot-dip galvanizing steel sheet having a tensile strength of 780 MPa or more and a thickness of 6 mm or less, applied to vehicle chassis components and the like, and relates to a method for lap-joint welding a hot-dip galvanizing steel sheet, controlling polarity of arc current to an appropriate fraction during welding, to effectively reduce porosity defects of a welded component up to 100 cm/min without introducing existing requirements such as providing a gap of an overlapped joint, changing an arc position, or the like, to improve strength of welded metal.

BACKGROUND ART

In the automotive sector, research into technology to reduce the weight of vehicle bodies and components is emerging as a major issue, due to fuel economy regulation policies in accordance with environmental protection to, e.g., global warming or the like. Chassis components, which may be important for vehicle driving performance, are also required to apply a high-strength steel material for weight reduction in accordance with such trend. In order to achieve weight reduction of components, it may be essential to increase strength of a material, and it may be an important factor to guarantee durability of components made of the high-strength steel material in an environment in which repeated fatigue loads are applied. In the case of arc welding, mainly used to secure strength when assembling vehicle chassis components, since an overlapping joint welding process between components may be performed by deposition of welding wires, the high-strength steel material may be particularly important to secure strength of the welded metal. In addition, as described above, due to thinning of a material by trends following high strength and weight reduction of components, demand for rust resistance for prevention of penetration corrosion has increased, to increase adoption of a plated steel material. However, porosity defects may be sensitive, which may be a factor that lowers strength of a welded portion. In particular, the higher the strength of steel, the greater the concern that a welded metal may be damaged due to insufficient strength by porosity defects in the welded metal.

Patent Document 1, a conventional patent, has proposed a gap of an overlapped joint in the range of 0.2 to 1.5 mm in order to suppress occurrence of porosity defects in an arc welding portion of Zn-based zinc coated steel sheet. However, when an actual component is applied, there may be a limit that cannot guarantee welding properties of a joint structure not having a gap. In addition, in order to solve the above problem, Patent Document 2 has proposed that a ternary shielding gas in which Ar is mixed with $CO_2$ and $O_2$ and a low-viscosity solid wire to which contents of Si, Mn, and the like are limited are applied, and arc positions are located to be spaced 1 mm apart from a tip of an overlapped joint. However, restrictions on a shielding gas and a welding material are inevitable, and there is a burden to maintain the arc positions constant when applying actual components.

PRIOR TECHNICAL DOCUMENT

Patent Document (Patent Document 1) Japanese Patent Laid-Open No. 2016-101593

(Patent Document 2) Japanese Patent Laid-Open No. 2015-167981

DISCLOSURE

Technical Problem

An aspect of the present invention may provide a method for welding a zinc coated steel sheet, optimizing a polarity fraction of arc welding current to effectively reduce porosity defects in an welded portion when lap-joint welding zinc coated steel sheets, to provide a component welding portion of a zinc coated steel sheet having a tensile strength of 780 MPa or more and a thickness of 6 mm or less without welding requirements such as providing a gap of an overlapped joint, adjusting a width of the joint, changing an arc position, or the like.

Technical Solution

An aspect of the present invention relates to a method for lap-joint welding a zinc coated steel sheet using a welding wire, to reduce a porosity defect of welded metal, wherein, when welding, a welding current is 150 to 300 A, a shielding gas is a mixed gas of Ar+10 to 30% $CO_2$, and a welding polarity is alternately altered to satisfy a welding polarity fraction, defined by the following relationship 1, in a range of 0.25 to 0.35, $$EN_{R,\%}/(EP_{R,\%}+EN_{R,\%}) \quad\quad\quad [\text{Relationship 1}]$$

where, $EN_{R,\%}$ is a welding polarity fraction of a negative electrode, and $EP_{R,\%}$ is a welding polarity fraction of a positive electrode.

In the method, the welding material may be an E70C-GS Φ1.0 metal cored wire.

In the method, a gap of a welded joint formed by the method may be 0 mm.

In the method, the welding current may be 200 to 270 A.

In the method, the zinc coated steel sheet may be HGI 780HB steel.

Advantageous Effects

According to an aspect of the present invention, a polarity fraction of an arc welding current may be optimized to effectively reduce porosity defects in an overlapped joint welded portion without a gap of a joint, to effectively improve strength of a welded portion of a zinc coated steel sheet component having a tensile strength of 780 MPa or more, manufactured accordingly. Therefore, industrial significance capable of expanding adoption of zinc coated steel sheets for securing high strength of components such as vehicle chassis members and the like, and rust resistance due to thinning thereof may be provided.

DESCRIPTION OF DRAWINGS

FIG. 1 is a schematic diagram illustrating polarity fractions of arc welding currents according to an embodiment of the present invention.

FIG. 2 is a cross-sectional photograph of a welded bead before and after optimizing polarity fractions of arc welding currents of a zinc coated steel sheet (where, a welding target base material, used, is HGI 780Hyber Burr having 2.0 mm thickness, a tensile strength of 810 MPa, and a plating amount on one side of 100 g/m$^2$).

FIG. 3 is a photograph showing an appearance of a welded portion and results of X-ray transmissions of the welded portion, after optimizing polarity fractions of arc welding current of a zinc coated steel sheet (a welding rate of 100 cm/min).

FIG. 4 is a graph illustrating results of measuring hardness of a welded portion, after optimizing polarity fractions of arc welding current of a zinc coated steel sheet.

FIG. 5 is a graph showing results of tensile curves of a welded portion, after optimizing polarity fractions of arc welding current of a zinc coated steel sheet.

BEST MODE FOR INVENTION

Hereinafter, the present invention will be described.

The inventors of the present invention confirmed that zinc vapor may be effectively discharged externally by optimally controlling polarity fractions of arc welding current when lap-joint welding a zinc coated steel sheet to vibrate a molten pool formed by welding, and porosity defects of a welded metal may be ultimately reduced, to complete the present invention.

For example, a method for welding a zinc coated steel sheet of the present invention relates to a method for lap-joint welding a zinc coated steel sheet using a welding wire, wherein, when welding, a welding current is 150 to 300 A, a shielding gas is a mixed gas of Ar+10 to 30% CO$_2$, and a welding polarity is alternately altered to satisfy a welding polarity fraction, defined by the following relationship 1, in a range of 0.25 to 0.35.

First, the present invention relates to a method for lap-joint welding a zinc coated steel sheet.

The lap-joint welding method may refer to a method of welding a first zinc coated steel sheet and a second zinc coated steel sheet stacked to partially overlap the first zinc coated steel sheet, while forming a welded metal by an overlapping arc welding process.

In the present invention, the zinc coated steel sheet may include a conventional hot-rolled or cold-rolled zinc coated steel sheet, and further, the coated steel sheet may be a Zn—Mg—Al-based alloy-plated steel sheet.

In the present invention, a first zinc coated steel sheet and a second zinc coated steel sheet stacked to partially overlap the first zinc coated steel sheet may be joined to form a welded metal by an arc welding process. For example, after preparing the first zinc coated steel sheet and the second zinc coated steel sheet, a welding line may be formed by stacking the second plated steel sheet on the first plated steel sheet to partially overlap them. Then, welding current may be supplied to a welding wire while providing a shielding gas along the formed welding line, to generate an arc to proceed with the arc welding process.

In the present invention, at this time, an overlapping width of a welded joint may be about 25 mm, when applied, but is not limited thereto.

In addition, in the present invention, the welding wire may be an E70C-GS Φ1.0 metal cored wire, and is not particularly limited to a type and a component of the welding wire.

The welding current during welding is preferably limited to 150 A or more and 300 A or less, and more preferably limited to 200 A or more and 270 A or less. When the current is too low, an effect of discharging plating vapor may decrease due to reduction of arc force. When the current is too high, a molten welded metal portion may be unstable and occurrence of porosity defects may increase.

In addition, in the present invention, it may be necessary to mix 10 to 30% CO$_2$ with Ar as a shielding gas during welding. For example, the shield gas may be Ar gas, and may contain 10 to 30% of CO$_2$ gas. When the CO$_2$ gas is included in an amount less than 10%, an arc heat pinch force effect may decrease due to arc expansion to reduce a plating vapor discharge effect. In addition, when the CO$_2$ gas is included in an amount exceeding 30%, the arc heat pinch force effect may excessively increase due to arc contraction to reduce the plating vapor discharging effect.

In addition, in the present invention, during the arc welding, a welding torch angle in the range of 30 to 45° and a progress angle in the range of 0 to 25° may be managed.

In addition, in the present invention, a gap of a welded joint formed 0 mm may be applied, but is not particularly limited thereto.

In lap-joint welding a zinc coated steel sheet, during arc welding, a zinc coated layer having a low boiling point may become zinc gas due to arc heat, and may float to an upper portion of a molten pool. In this case, most thereof may be discharged, but a portion thereof may remain to form a blowhole, which may be a hollow cavity when solidified. Therefore, there may be problems in that a welded metal manufactured by welding has porosity defects, and thus, a welded metal having excellent tensile strength cannot be obtained.

Therefore, the present invention may be provided to solve the problems, and may be characterized in that a welding polarity is alternately altered to satisfy a welding polarity fraction, defined by the following relationship 1, in a range of 0.25 to 0.35. Thereby, a molten pool formed by welding may be vibrated to discharge zinc vapor, to reduce a porosity defect of welded metal.

$$EN_{R,\%}/(EP_{R,\%}+EN_{R,\%}) \quad \text{[Relationship 1]}$$

where, $EN_{R,\%}$ is a welding polarity fraction of a negative electrode, and $EP_{R,\%}$ is a welding polarity fraction of a positive electrode.

FIG. 1 is a schematic diagram illustrating polarity fractions of arc welding current according to an embodiment of the present invention. As illustrated in FIG. 1, welding polarity fractions may be appropriately mixed and altered to increase vibration of a molten pool due to an increase in arc pressure and droplet transfer frequency, to promote an increase in discharge of zinc vapor.

In the present invention, in order to effectively discharge the zinc vapor from the molten pool when lap-joint welding a zinc coated steel sheet, it may be characterized by controlling a welding polarity fraction ($EP_{R,\%}$) of a positive electrode of a welding wire and a welding polarity fraction ($EN_{R,\%}$) of a negative electrode of a welding target base material by the above relationship 1 to be within an appropriate value, and introduction of this concept may be due to the following technical idea.

In a general case of a direct current electrode positive (DCEP) pulse, there may be a limitation in that a volume of a molten pool may increase due to an increase in heat input by to arc contraction, to reduce discharge of pores due to zinc vapor generated during welding. In contrast, when a DCEP and a direct current negative (DCEN) polarity are mixed in an appropriate fraction and altered, arc contraction and oxygen atmosphere may increase so that the increase of the negative electrode activation of the wire in a DCEN cycle could be realized. For example, during the DCEN cycle, occurrence of a cathode spot and arc concentration may be frequent on an upper end of the wire to heat the wire. Then, a current path may be maintained in a subsequent DCEP cycle, and an arc may be generated on the upper end of the wire. At this time, globular and spray droplet transfer modes may occur to simultaneously increase droplet transfer frequency and arc pressure pressurization frequency, to maximize discharge of pores generated in the molten pool.

Therefore, in the case of a variable polarity arc, since the arc pressure and the droplet transfer may be irregular and high frequency, an effect of discharging the pores may be excellent. When a fraction of the DCEN polarity is lower than an appropriate value, the effect may be reduced when a value defined by the above relationship 1 is less than 0.25.

In the case of a zinc coated steel sheet such as HGI, an arc may be eccentric on the DCEN polarity due to influence of a zinc coated layer. Therefore, an effective arc radius may decrease as a cathode spot may be distributed over a wide area on a surface of the target base material, or the cathode spot may be concentrated on a specific region, to reduce welding heat input efficiency. In addition, when a fraction of the DCEN polarity is high, coarse and unstable globular transfer and arcs may occur, and an exposure time of the cathode spot to the droplet may increase. Therefore, since unstable and excessive spatter may be generated due to occurrence of a cathode jet on a surface of the droplet, arc instability and reduction in discharging pores may appear. For example, when a fraction of the DCEN polarity exceeds the appropriate value (when a value defined by the relationship 1 exceeds 0.35), an adverse effect on suppressing the occurrence of porosity defects in the welded portion may occur.

Hereinafter, the present invention will be described in detail through examples.

MODE FOR INVENTION

EXAMPLE

Two (2) HGI 780Hyber Burring steel sheets having 2.0 mm thickness and a plating amount on one side of 100 g/m$^2$ were made to overlap each other by 25 mm, and a connection portion therebetween was welded. Specifically, welding wires and welding conditions were used as shown in Tables 1 and 2, respectively, the HGI 780HB steel was lap-joint welded. At this time, the presence or absence of pit generation and pore area ratios were measured and shown in Table 1 below, and tensile strengths and fracture positions of welded portions were measured and shown in Table 2 below.

TABLE 1

| No. | Welding Material | Welding Conditions (Current-Voltage-Rate) | Current Properties | Pit | Pore Area Ratios | Example |
|---|---|---|---|---|---|---|
| 1 | ER70S-6Φ1.2 | 202 A-20.6 V-0.6 m/min | EP:EN = 100:0 | X | 1.55% | CE1 |
| 2 | ER70S-6Φ1.2 | 242 A-23.7 V-0.8 m/min | EP:EN = 100:0, Pulse | ○ | 12.67% | CE2 |
| 3 | ER70S-6Φ1.2 | 263 A-25.6 V-1.0 m/min | EP:EN = 100:0, Pulse | ○ | 20.60% | CE3 |
| 4 | ER70S-3Φ1.0 | 162 A-26.4 V-0.6 m/min | EP:EN = 100:0, Pulse | X | 4.46% | CE4 |
| 5 | ER70S-3Φ1.0 | 217 A-28.9 V-0.8 m/min | EP:EN = 100:0, Pulse | X | 5.70% | CE5 |
| 6 | ER70S-3Φ1.0 | 257 A-30.0 V-1.0 m/min | EP:EN = 100:0, Pulse | ○ | 8.25% | CE6 |
| 7 | E70C-GSΦ1.0 | 214 A-24.0 V-1.0 m/min | EP:EN = 50:50, Pulse | X | 2.51% | CE7 |
| 8 | E70C-GSΦ1.0 | 213 A-24.0 V-1.0 m/min | EP:EN = 60:40, Pulse | X | 2.34% | CE8 |
| 9 | E70C-GSΦ1.0 | 214 A-24.0 V-1.0 m/min | EP:EN = 65:35, Pulse | X | 0.97% | IE1 |
| 10 | E70C-GSΦ1.0 | 209 A-24.0 V-1.0 m/min | EP:EN = 70:30, Pulse | X | 0.87% | IE2 |
| 11 | E70C-GSΦ1.0 | 216 A-24.2 V-1.0 m/min | EP:EN = 75:25, Pulse | X | 0.94% | IE3 |
| 12 | E70C-GSΦ1.0 | 210 A-24.0 V-1.0 m/min | EP:EN = 80:20, Pulse | X | 1.52% | CE9 |

*IE: Inventive Example, **CE: Comparative Example

TABLE 2

| No. | Welding Material | Welding Conditions (Current-Voltage-Rate) | Current Properties | Tensile Strength | Fracture Position | Example |
|---|---|---|---|---|---|---|
| 1 | ER70S-6Φ1.2 | 202 A-20.6 V-0.6 m/min | EP:EN = 100:0 | 625 MPa | Welded Metal | CE1 |
| 2 | ER70S-6Φ1.2 | 242 A-23.7 V-0.8 m/min | EP:EN = 100:0, Pulse | 599 MPa | Welded Metal | CE2 |
| 3 | ER70S-6Φ1.2 | 263 A-25.6 V-1.0 m/min | EP:EN = 100:0, Pulse | 473 MPa | Welded Metal | CE3 |
| 4 | ER70S-3Φ1.0 | 162 A-26.4 V-0.6 m/min | EP:EN = 100:0, Pulse | 690 MPa | Heat Affected Zone | CE4 |
| 5 | ER70S-3Φ1.0 | 217 A-28.9 V-0.8 m/min | EP:EN = 100:0, Pulse | 678 MPa | Heat Affected Zone | CE5 |
| 6 | ER70S-3Φ1.0 | 257 A-30.0 V-1.0 m/min | EP:EN = 100:0, Pulse | 670 MPa | Heat Affected Zone | CE6 |
| 7 | E70C-GSΦ1.0 | 214 A-24.0 V-1.0 m/min | EP:EN = 50:50, Pulse | 692 MPa | Heat Affected Zone | CE7 |
| 8 | E70C-GSΦ1.0 | 213 A-24.0 V-1.0 m/min | EP:EN = 60:40, Pulse | 696 MPa | Heat Affected Zone | CE8 |
| 9 | E70C-GSΦ1.0 | 214 A-24.0 V-1.0 m/min | EP:EN = 65:35, Pulse | 700 MPa | Heat Affected Zone | IE1 |
| 10 | E70C-GSΦ1.0 | 209 A-24.0 V-1.0 m/min | EP:EN = 70:30, Pulse | 702 MPa | Heat Affected Zone | IE2 |
| 11 | E70C-GSΦ1.0 | 216 A-24.2 V-1.0 m/min | EP:EN = 75:25, Pulse | 701 MPa | Heat Affected Zone | IE3 |
| 12 | E70C-GSΦ1.0 | 213 A-24.0 V-1.0 m/min | EP:EN = 80:20, Pulse | 698 MPa | Heat Affected Zone | CE9 |

*IE: Inventive Example, **CE: Comparative Example

As shown in Tables 1 and 2, it can be seen that Inventive Examples 1 to 3 in which polarity fraction values defined by the relationship 1 satisfy the range of 0.25 to 0.35 and as well as welding conditions such as welding current and the like satisfy a given range had reduced effect of discharging zinc vapor to reduce porosity defects in a welded portion and improved a tensile strength of the welded portion, as compared to Comparative Examples 1 to 8 in which the polarity fraction values and the welding conditions do not.

FIG. 2 is a cross-sectional photograph of a welded bead before (Comparative Example 8) and after (Inventive Example 2) optimizing polarity fractions of arc welding current of a zinc coated steel sheet, and FIG. 3 is a photograph showing an appearance of a welded portion and results of X-ray transmission of the welded portion, after optimizing polarity fractions of arc welding current of a zinc coated steel sheet (welding rate of 100 cm/min), and FIG. 4 is a graph illustrating results of measuring hardness of a welded portion, after optimizing polarity fractions of arc welding current of a zinc coated steel sheet of Inventive Example 2, and FIG. 5 is a graph showing results of tensile curves of a welded portion, after optimizing polarity fractions of arc welding current of a zinc coated steel sheet of Inventive Example 2 of the present invention.

As can be seen in FIGS. 4 and 5, even at a welding rate of 100 cm/min, a hardness value of a welded metal portion was quite constant without a significant decrease due to porosity defects. In addition, it can be seen as a result of suppressing occurrence of porosity defects in the welded metal due to fracture in heat affected zones without fracture of the welded metal portions.

While example embodiments have been shown and described above, it will be apparent to those skilled in the art that modifications and variations could be made without departing from the scope of the present invention as defined by the appended claims.

The invention claimed is:

1. A lap-joint welding method of welding a first zinc coated steel sheet and a second zinc coated steel sheet stacked to partially overlap the first zinc coated steel sheet using a welding wire, to reduce a porosity defect of welded metal, comprising:
   welding, wherein the welded metal has a pore area ratio of 0.97% or less and have a tensile strength of 700 MPa or more,
   wherein a gap of a welded joint formed by the method is 0 mm,
   wherein the welding current is supplied as a bidirectional pulse current in which positive direct current and negative direct current are of equal and constant absolute value in a range from 200 A to 270 A, and
   wherein a welding polarity is alternately altered to satisfy a welding polarity fraction, in a range of 0.25 to 0.35, the welding polarity being defined by $$EN_{R,\%}/(EP_{R,\%}+EN_{R,\%})$$

where, $EN_{R,\%}$ is a fraction of time for which current through the welding wire is negative direct current, and $EP_{R,\%}$ is a fraction of time for which current through the welding wire is positive direct current.

2. The method of claim 1, wherein the welding wire is an E70C-GS Φ1.0 metal cored wire.

3. The method of claim 1, wherein the zinc coated steel sheet is HGI 780HB steel.

* * * * *